J. H. VAN ARNUM.
Chicken-Coops.

No. 154,534.  Patented Aug. 25, 1874.

WITNESSES:
P. C. Dieterich
H. C. Scott

INVENTOR.
Jacob H. Van Arnum
per C. H. Watson & Co.
ATTORNEYS.

UNITED STATES PATENT OFFICE.

JACOB H. VAN ARNUM, OF KENDALLVILLE, INDIANA.

IMPROVEMENT IN CHICKEN-COOPS.

Specification forming part of Letters Patent No. 154,534, dated August 25, 1874; application filed August 5, 1874.

*To all whom it may concern:*

Be it known that I, JACOB H. VAN ARNUM, of Kendallville, in the county of Noble and State of Indiana, have invented certain new and useful Improvements in Folding Chicken-Coop and Crate; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The nature of my invention consists in the construction and arrangement of a folding chicken-coop and crate, for shipping poultry, fruit, &c., as will be hereinafter more fully set forth.

Figure 1:
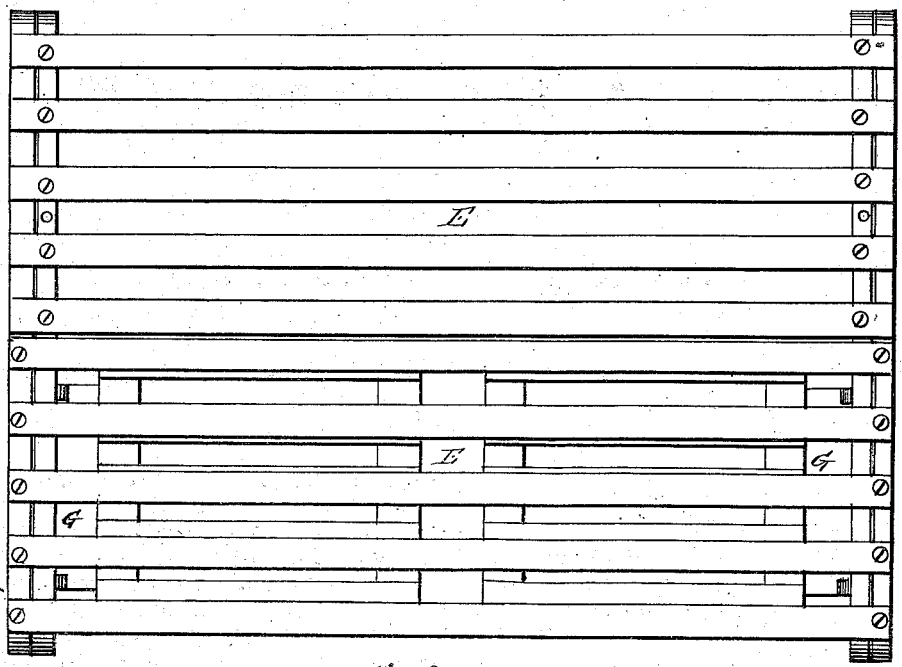
Figure 2:
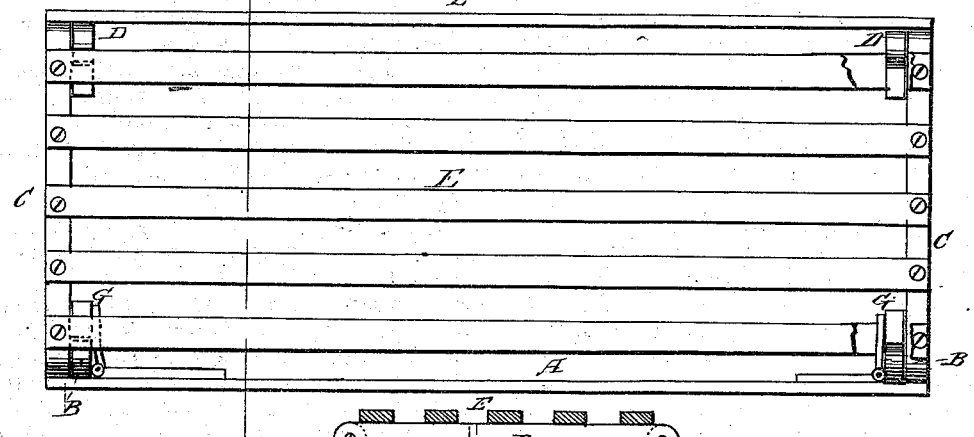
Figure 3:
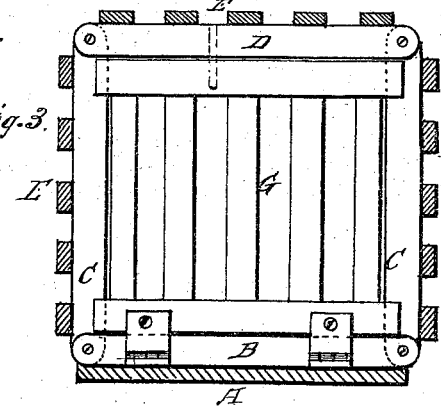

In the accompanying drawing, Figure 1 represents a plan view of my coop or crate folded. Fig. 2 is a top view of the same, and Fig. 3 is a vertical section through line *x x* of Fig. 2.

A represents the bottom of the box, provided on the upper side, near each end, with a cross-bar, B. To each end of each cross-bar B is pivoted a bar, C, and the outer ends of the two bars C C, at each end, are connected by a bar, D. Slats E E are secured lengthwise to the bars C C and to the bars D D, forming the sides and top of the coop and crate. The ends of the box are formed of hinged slatted gates G G. These gates or end pieces are hinged to the bottom A, or to the cross-bars B B, in such a manner that, when the box is in proper position, they will rest upon said cross-bars, and fit in between the sides and top of the box, and thus not only close the end, but also brace and hold the box in proper position. Each end piece is held by a single pin, *a*, passing through the bar D into the end piece. By withdrawing the pins *a a* the end pieces G G can be thrown down on the bottom A, and then the box folded flat, to take up but little room in transportation in return shipment.

The coop or box may be filled from the top, by having one or more of the slats removable, or from either end, as desired. It may be used as a chicken-coop, and also for transporting fruit or vegetables or other articles, as desired.

Having thus fully described my invention, what I claim as new, and desire to secure by Letters Patent, is—

The combination of the bottom A, cross-bars B, hinged bars C and D, slats E, and hinged end pieces G, all constructed substantially as and for the purposes herein set forth.

In testimony that I claim the foregoing as my own, I affix my signature in presence of two witnesses.

JACOB H. VAN ARNUM.

Witnesses:
L. E. GOODWIN,
G. ERICKSON.